US007113871B2

(12) United States Patent
Renner

(10) Patent No.: US 7,113,871 B2
(45) Date of Patent: Sep. 26, 2006

(54) CONDITION MONITORING IN TECHNICAL PROCESSES

(76) Inventor: Peter Renner, Heiligenstock 2, D-51515 Kürten (DE)

( * ) Notice: Subject to any disclaimer, the term of this patent is extended or adjusted under 35 U.S.C. 154(b) by 0 days.

(21) Appl. No.: 10/988,985

(22) Filed: Nov. 15, 2004

(65) Prior Publication Data

US 2005/0171705 A1 Aug. 4, 2005

(30) Foreign Application Priority Data

Nov. 18, 2003 (EP) .................................. 03026346

(51) Int. Cl.
*G06F 17/40* (2006.01)
(52) U.S. Cl. .................... 702/35; 702/187; 700/175
(58) Field of Classification Search .................. 702/35
See application file for complete search history.

(56) References Cited

U.S. PATENT DOCUMENTS

| 4,456,960 | A | * | 6/1984 | Wakai | .................. 700/175 |
| 5,210,704 | A | * | 5/1993 | Husseiny | .................. 702/34 |
| 5,243,533 | A | * | 9/1993 | Takagi et al. | .................. 700/175 |
| 6,885,972 | B1 | * | 4/2005 | Samata et al. | .................. 702/182 |
| 6,928,370 | B1 | * | 8/2005 | Anuzis et al. | .................. 702/56 |

\* cited by examiner

*Primary Examiner*—John Barlow
*Assistant Examiner*—Jonathan Moffat
(74) *Attorney, Agent, or Firm*—Charles L. Schwab; Nexsen Pruet, LLC

(57) ABSTRACT

The invention makes a contribution in order that machines and installations are better utilized, their service life is extended, reliability is improved, the loss of valuable materials is avoided, test results are optimized, and energy consumption is diminished. It is an expert system that acquires and assesses the condition of installations, machines and apparatuses. The mechanism proceeds from a normal condition and permanently observes short-term, medium-term and long-term changes. If variations in the normal condition are detected promptly, major instances of damage can be avoided by promptly performing corrective actions before major instances of damage associated with prolonged downtimes occur.

14 Claims, 5 Drawing Sheets

TREND DIAGRAM SHOWING DEVIATION

CONDITION MONITORING IN TECHNICAL PROCESSES

BACKGROUND OF THE INVENTION

The invention relates to a system for monitoring technical processes, machines, installations and apparatuses. If changes in the normal condition are detected promptly, major instances of damage can be avoided by promptly performing corrective actions before major instances of damage associated with prolonged downtimes occur. Changes in machines, apparatuses and installations are caused by wear, corrosion, deposits, plugging, contamination, and nonspecifically occurring operational malfunctions.

First approaches to machine condition monitoring with an eye to crash prevention and condition-oriented maintenance are based on complicated mathematical calculations preferably based on neuronal networks. They have the disadvantage that a very great cost expenditure is occasioned because the application in question must be trained. The results obtained are rather meager. Other methods also address only partial aspects and have not met with total success.

The difficulty in assessing a machine condition results from the following circumstances. Small changes in the temperature values of bearing positions, for example, are significant for the degree of wearing-out of the bearings. The temperature values, however, are subject to a number of service-associated influences. The temperature values are affected by the rotation speed, the radial force and the ambient temperature. It is therefore not possible, according to the existing art, to track small changes, because service-associated fluctuations in the measured values are larger than the small changes attributable to bearing wear.

OBJECTS AND SUMMARY OF THE INVENTION

It is an object of the invention to make a contribution in order that machines and installations are better utilized, their service life is extended, reliability is improved, the loss of valuable materials is avoided, test results are optimized, and energy consumption is diminished. It is a further object of the invention to detect and report promptly the threat of total failures (crashes). Operational malfunctions and instrumentation malfunctions that play out on a scale of seconds or minutes should likewise be detected.

The present way of addressing the problem is based on what has been learned about the internal structure of technical processes. Persistent changes associated with wearing-out and based on wear, corrosion, deposits, leaks and the like are separated from service-associated effects that impact machines and installations in order that persistent changes associated with wearing-out can be isolated in this way.

Reference groups of mutually dependent measured variables are formed. The expression measured variables (measured values) denotes, among other things, temperatures, pressures, flow rates, rotation speeds, vibration intensities, etc., which are acquired via measurement channels. The measurement channels form measurement chains that include sensors, lines and measurement electronics. The expression dependent measured variables (measured values) denotes those quantities that bear an internal relationship to the function or design of a machine or installation.

For example, the exhaust temperatures of a plurality of cylinders of an internal combustion engine are internally related to one another. They fluctuate in dependence on external parameters, the fluctuation being roughly proportional from one case to another. It is governed by the engine rotation speed and the engine power.

Reference groups are therefore formed from channels that are in an internal relationship or channels whose measured values are mutually dependent. Through persistent acquisition of measured data, long-term changes representing the condition of the machine or installation are determined.

In one embodiment of the invention it is proposed to split the measurement channels of a reference group into the categories of identification channels and condition channels, so that a quasi-static phase of operation can be defined using the identification channels. The condition channels serve for assessing the condition of the installation.

Technical processes tend to a kind of static (steady-state) phase of operation. Such phases manifest themselves, for example, in that the service temperature has been reached. In the case of controllers, changing the setpoint value initially brings about a dynamic, transient phase, after which a controlled, quasi-static phase of operation (new operating point) will come about. Thus a quasi-static and a dynamic phase can be distinguished in the operating sequence. The quasi-static phase can be distinguished because it is not a true static phase of operation. In actuality, further effects, such as alternating loads, ambient temperatures, etc., act continuously on the process so that no true static phase of operation exists. In the system of this invention a quasi-static and a dynamic phase of operation are recognized.

It is essential for the invention that measured data are utilized for assessing the machine condition only during the quasi-static phase of operation. No measured data that fall during machine stoppage and the dynamic phase of operation are utilized for assessing the machine condition. In this way, gaps arise in a continuous data stream, desired per se, as a consequence of machine stoppages and dynamic phases of operation.

A further inventive concept is to fill up these gaps with dummy values so that a quasi-continuous stream of measured data arises. The dummy values are specially characterized (usually in gray) in trend charts.

A further embodiment of the invention makes it possible to identify the quasi-static phase of operation. The identification channels serve for identifying the quasi-static phase. A test is continually performed to ascertain whether the quasi-static phase is in effect. This is done by calculating identification conditions that relate to the identification channels.

In the case of a controlled drive, the setpoint value and the actual value of the rotation speed can be defined as identification channels. The condition for the quasi-static phase holds when the setpoint value and the actual value agree, that is, when the controlled condition has taken effect.

Usually it is necessary to have a plurality of conditions, all of which must be true. These can be:

(a) rotation speed greater than zero (machine is running) and (b) setpoint value and actual value agree.

In other applications, a condition of a steady state can be employed for identifying the quasi-static phase of operation. This condition is characterized in that, during a specified time, measured values move only within a tolerance band. Such an application may be an internal combustion engine, in which case a test is performed to ascertain whether the coolant temperature is in a steady state. Other measured variables, such as the individual cylinder temperatures, exhaust temperatures, intensity of bearing vibration, serve as condition channels in order that the machine condition can be assessed.

Difficulties can result because, during the quasi-static phase of operation, processes can be impacted by a variety of effects that can be acquired only with difficulty using normal metrological methods, and the measured values of the condition channels can be influenced by these effects in such fashion that comparison values are not available. In the case of a drive, for example, the torque can vary in an uncontrolled manner. A variation in the ambient temperature can likewise affect the measured values of the condition channels.

The invention makes use of the fact that many process parameters are correlated with one another or bear a relation to one another. An example of correlated process parameters are bearings of a shaft having a plurality of bearings. An example of common relations are process parameters such as pressures, temperatures, exhaust temperatures of the individual cylinders in the case of an internal combustion engine. The cylinders are similar in construction. They have the task of generating the driving power in equal shares. Thus, in the case of correct operation, their measured values display the same trends.

Such process parameters, which are defined as condition channels, are combined into reference groups. Such channels, which are combined into reference groups, show common tendencies in the case of normal operation free of malfunctions. For example, the exhaust temperatures will vary approximately in proportion to the driving power. Conversely, if one of the cylinders displays deviant values, it can be inferred that some kind of change is present, with no specification of the nature of the change. Such changes can show up in the short term, the medium term, and the long term.

In order to specify what deviations have arisen, supply indications of operational malfunctions, warn of imminent total failures, and give instructions to perform corrective work associated with the condition of the machines or installations, it is proposed in a further inventive step that the measured values of the condition channels of the reference groups be compressed into statistical condition values, preferably into means. The compression is based on a selection of the ordinary time ranges or a multiple thereof, such as second values, minute values, hour values, day values, week values, month values or year values. In this way it becomes possible to detect slow, moderately fast and fast variations in the measured values.

In order that the mean values can be assigned to the times of occurrence, the values are time-stamped. The time stamp contains the current clock time and the date.

In a further inventive step, the mean values of the individual time series are aggregated into test blocks, which contain a fixed number of values. These test blocks are set up in moving fashion. The expression moving means that every time a new value is formed, the oldest value is dropped and the newest one is incorporated. Thus the test blocks are set up in time synchrony, have the same length, and are thus comparable.

The percent difference between the smallest and the largest value of a test block is the swing. In subsequent evaluations, the swing and the shape of the curve (course) are compared with limiting values, and reports are issued if the limiting values are exceeded. If a swing exceeds a limiting value, the swing is compared with the mean of the swings of the other test blocks of the same time series of reference groups. If the difference exceeds a further limiting value, then a definitive deviation has been established and leads to further investigations. The course of the test block in question is then checked. The course is investigated for linear and progressive behavior, a distinction being made between rising and falling.

The first and second derivatives are used to define the shape of the curve, curve limiting values determining whether the course is linearly rising/falling or progressively rising/falling. Such deviations of the swing and the shape of the curve can arise in all time series. They are assessed differently depending on which time series they arise in. In addition, linear behavior is rated as less severe than progressive behavior. Depending on which time series deviations arise in, and whether they are linear or progressive, they lead to entries in observation lists, warning lists, and/or alarms are triggered. All parameters are configurable and can be specified by a person skilled in the art who is familiar with his process. Essentially, fast changes on a scale of seconds or minutes point to operational malfunctions or instrumentation malfunctions. Moderately fast changes on a scale of minutes and hours point to an imminent crash, the prediction being reinforced in the case of a progressive course. Slow changes on a scale of days and months are an indicator of the need for corrective actions. In the case of deviations associated with corrective action and arising in day and month time series, the comparison with the other channels of the reference group is omitted.

A special case of the above-described inventive idea applies when a reference group comprises just one measurement channel. This is the case when no other correlated measurement channels are available. In this case the following procedure is used. If a swing exceeding a first limiting value is established, a comparison is made with the current value of the next higher time series. If the difference exceeds a second limiting value, then, as previously described, the shape of the curve is tested and appropriate outputs are executed. In general, the comparison with the next higher time series is not performed in the case of slow changes, from the day time series up. The various limiting values that separate the normal condition from the condition of observation and warning can be input manually in standard fashion via on-screen dialogs.

In a further development of the invention, a learning method can be applied. This is accomplished by acquiring permanent data in normal, malfunction-free operation, during the quasi-static phase of operation, so that limits (maxima and minima) for normal operation are revealed. The limiting values can then be positioned manually or automatically at the respective maximal and minimal values with allowance for a margin of safety.

BRIEF DESCRIPTION OF THE DRAWINGS

For the further explanation of the invention, reference is made to the drawings, depicting exemplary embodiments in simplified fashion, in which.

DETAILED DESCRIPTION OF THE INVENTION

Figure 1:
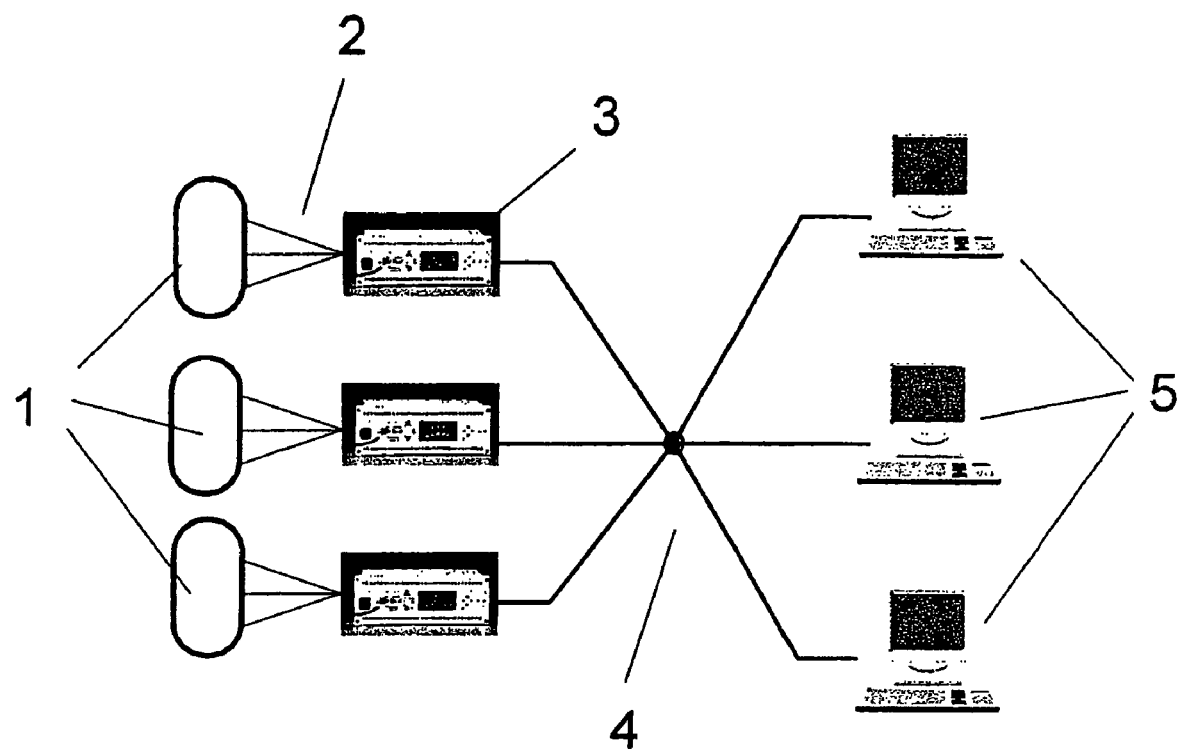
FIG. 1 is a schematic depiction of a process monitoring.

The reference characters in FIG. 1 have the following meanings:

1 processes that are being monitored;
2 lines serving as connections between the sensors of the processes and measurement units;
3 measurement units as interfaces between the processes and the PCs;
4 a data network serving as data connection between the measurement units and the PCs; and
5 PCs on which the monitoring software is installed.

The function according to FIG. 1 is next described. Measurement units 3 serve as interface between processes 1 whose condition is to be monitored. In processes 1 there are sensors, which are connected to measurement units 3 via connecting lines 2. Measurement units 3 are in turn connected to PCs 5 via data network 4. In this way, analog and digital signals of the sensors can be conveyed to the PCs. The governing software, which carries out monitoring tasks in combination with the functions of the measurement units, is installed on PCs 5.

Figure 2:
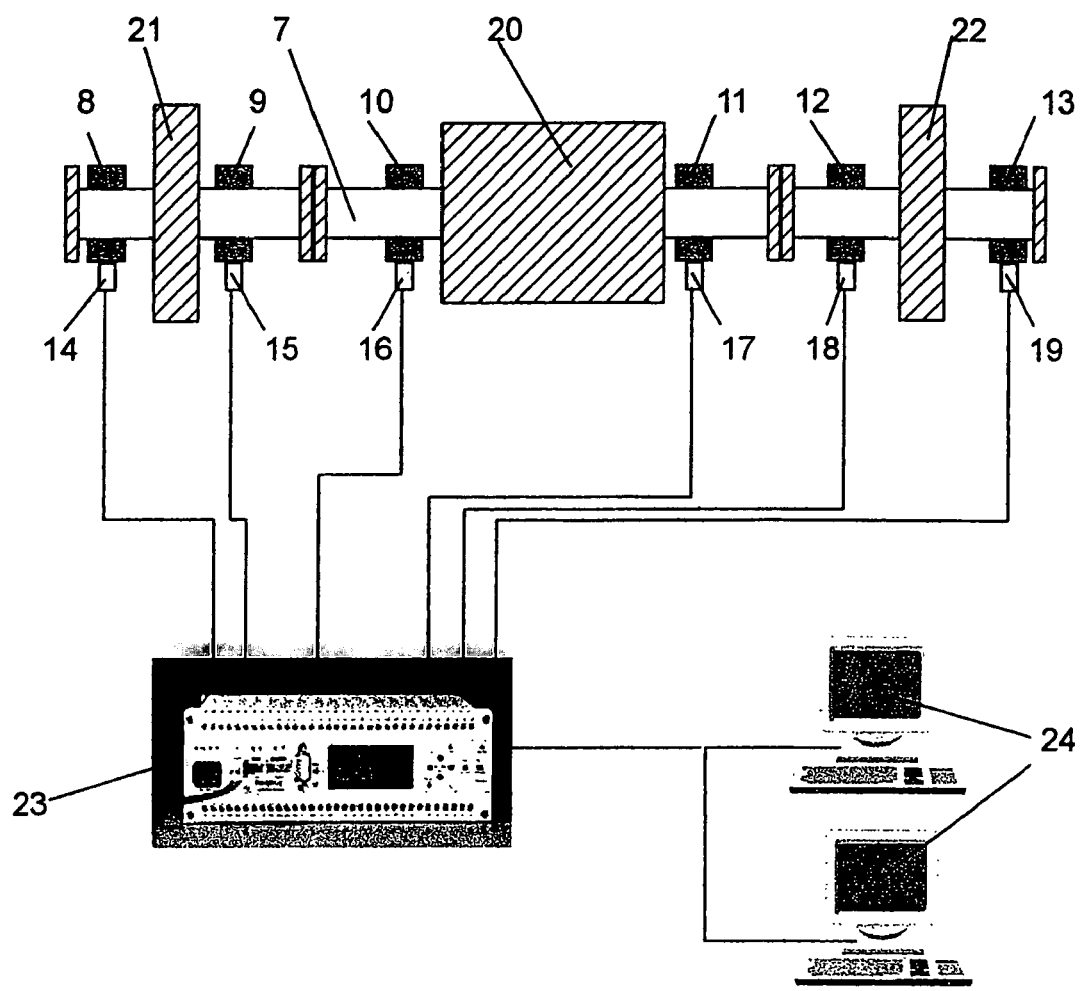
FIG. 2 is a schematic depiction of a drive shaft with six bearings, having sensors for acquiring the bearing temperatures, having a measurement unit as interface between the process and the PC, and having a PC on which the governing software according to the invention is installed.

The reference characters in FIG. 2 have the following meanings:

7 a drive shaft;
8 to 13 bearing positions of the drive shaft;
14 to 19 sensors that acquire the temperature of the bearing positions;
20 a drive motor;
21 and 22 gears for driving connected equipments, for example air compressors;
23 a measurement unit as interface between the temperature sensors; and
24 PCs for machine monitoring and process control.

The function according to FIG. 2 is next described. Such a drive can serve to drive large pumps, compressors and the like via gears 21, 22. Electric motor 20 drives shaft 7. Shaft 7 is provided with six bearings at bearing positions 8, 9, 10, 11, 12, 13. Sensors 14, 15, 16, 17, 18, 19 serve to acquire the temperatures of the individual bearing positions. The temperature signals are supplied to a measurement interface 23 via lines. Depending on the design of measurement interface 23, it can take over a number of tasks. If temperature sensors 14, 15, 16, 17, 18, 19 are of thermocouple type, they deliver millivolt signals. Measurement interface 23 transforms these signals into digital measured values in degrees Celsius. The measured temperature values pass via a data network to PCs 24. The governing software for tracking small changes, in this case variations in the temperature values of bearing positions 8 to 13, is installed on one of these PCs 24. Such temperature values are not constant. They vary with the rotation speed of the shaft, the radial force acting on individual bearing positions 8 to 13, and the ambient temperature. It appears impossible to track small changes that are relevant to the condition of bearings 8 to 13. Small changes in the temperature values of individual bearings 8 to 13 are significant for the anticipated service life. Progressive temperature variations, even if they are small, point to a failure of the bearing in the near future. In case of abrupt changes, a crash is immediately imminent. In order to track small changes, the internal relationship through the common shaft rotation speed of shaft 7 is utilized.

Figure 3:
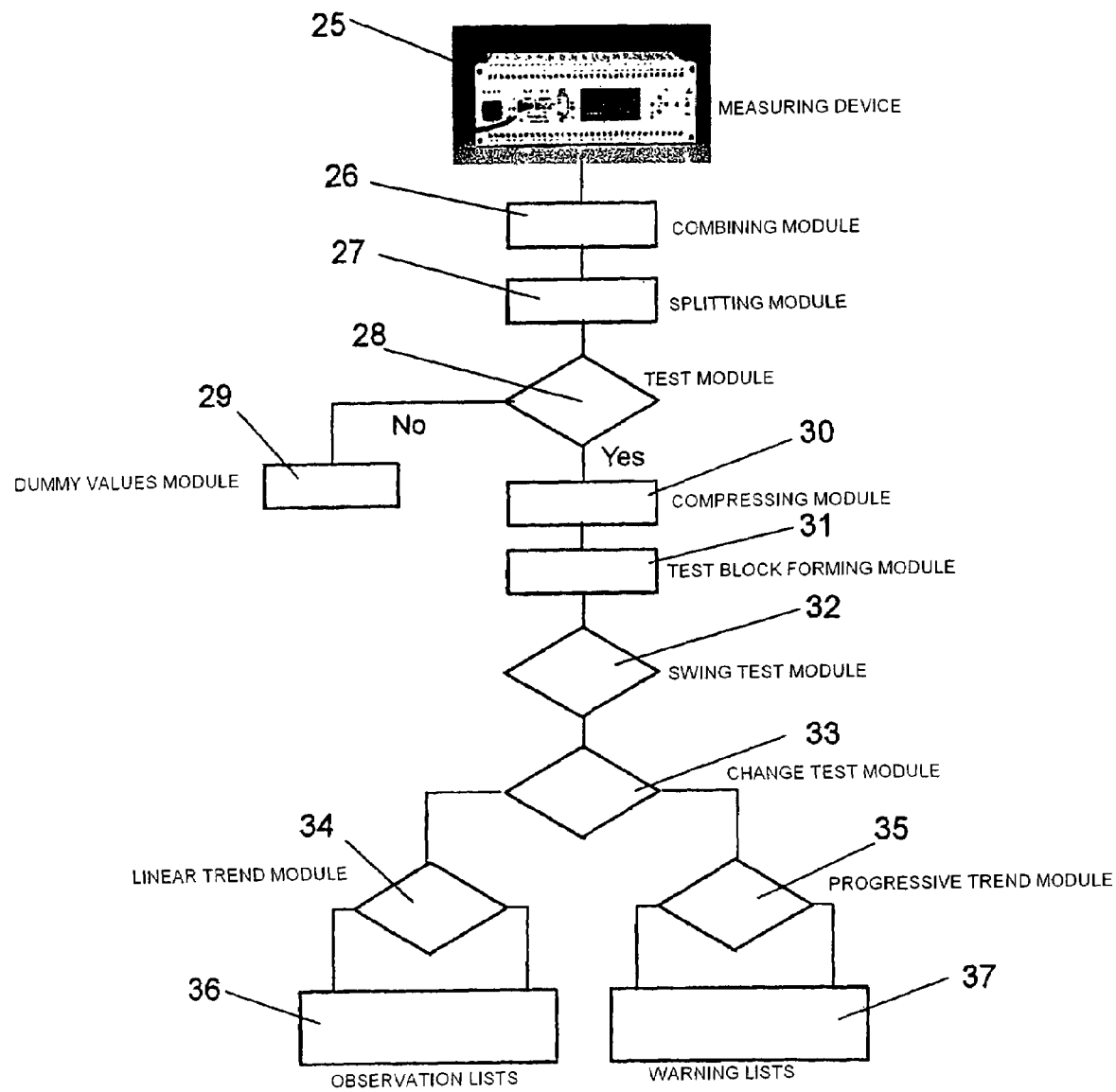
FIG. 3 is a flowchart showing the manner in which the condition monitoring functions.
Figure 4:
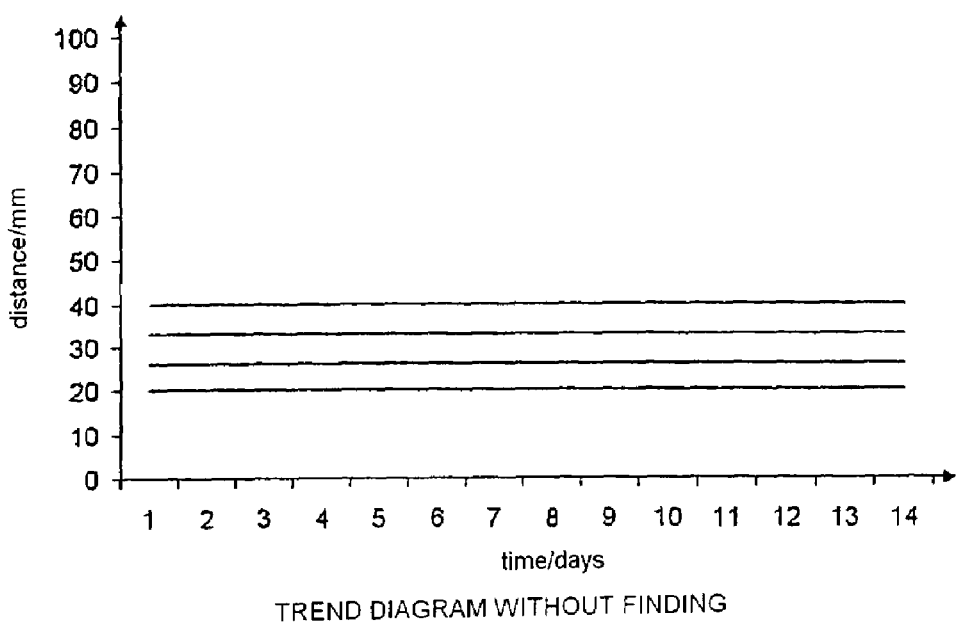
FIG. 4 is a schematic trend diagram without any finding.
Figure 5:
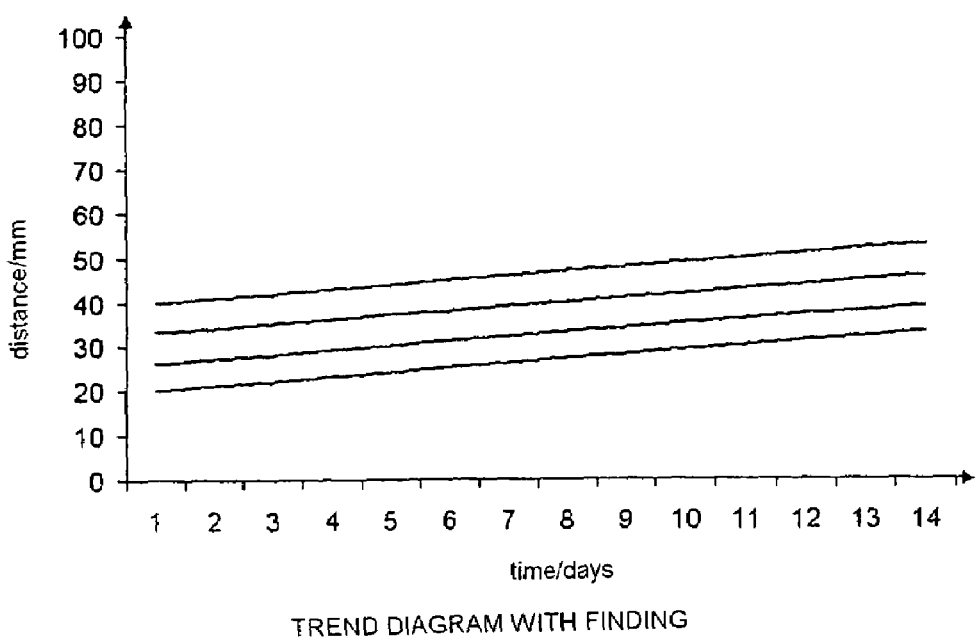
FIG. 5 is a schematic trend diagram with a linear course of the conditions of the channels.
Figure 6:
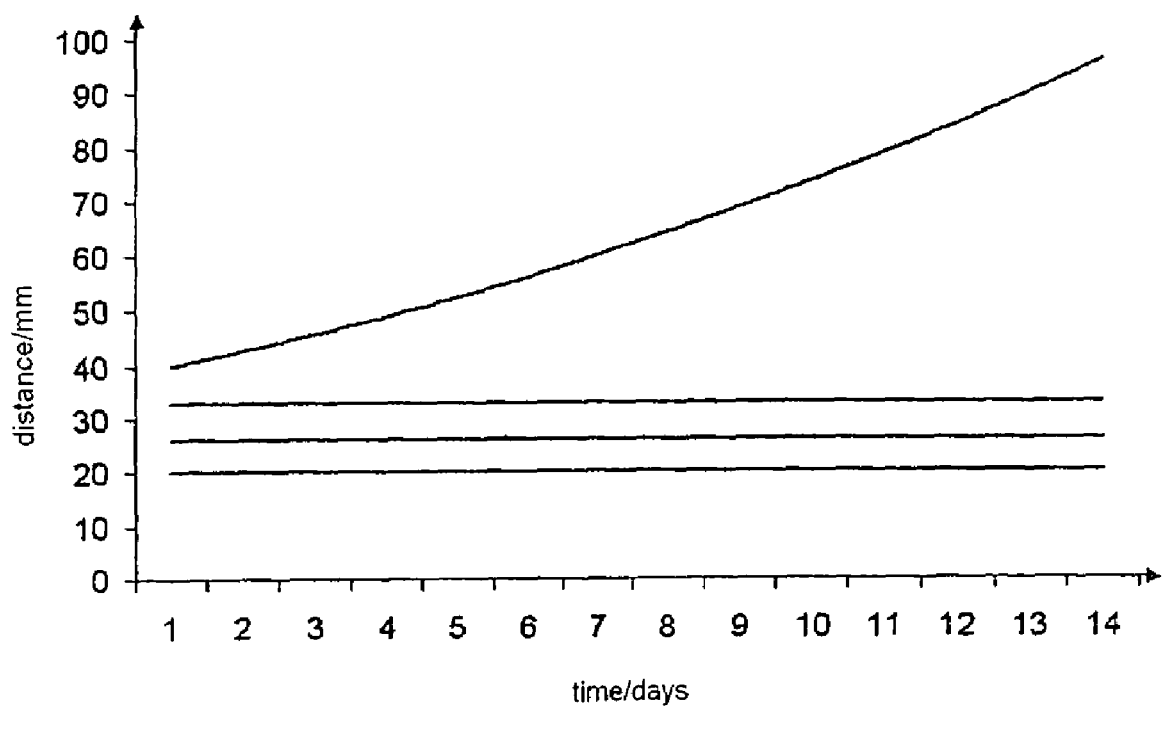
FIG. 6 is a schematic trend diagram in which one channel shows a progressive deviation.

The reference characters in FIG. 3 denote the following things:

25 a measuring device serving as interface between the process and the PCs;
26 a module (acquire and group measurement data). The measurement data are read by the interface and the measurement channels are combined into reference groups;
27 a module in which the channels of the reference groups are split into identification channels and condition channels;
28 a further module (identification of quasi-static phase of operation) tests whether a process is in the quasi-static phase of operation;
29 a module that makes sure dummy values replace real measured values in the measurement series if the result in 28 is negative;
30 a module in which the measured values and the dummy values are compressed into statistical values;
31 a module in which the statistical values of the time series are combined into test blocks;
32 a module in which a test is performed to ascertain whether, within a test block, there is a percent change in the compressed measured values that exceeds a limiting value. If this is the case, the percent change in this test block is compared with the mean of the changes in the other test blocks. If the difference exceeds a limiting value, the shape of the curve of the test block is tested in the subsequent evaluations;
33 a module in which a test is performed to ascertain whether the changes in the values of the test block took place in linear or progressive fashion;
34 a module in which a test is performed to ascertain whether the trend, if it is linear, is rising or falling;
35 a module in which a test is performed to ascertain whether the trend, if it is progressive, is rising or falling;
36 observation lists, which supply the service personnel with information items concerning developing malfunctions that are less severe;
37 warning lists, which supply the service personnel with information items concerning developing severe malfunctions.

FIG. 3 shows the flowchart for the processing of data for a reference group. A plurality of reference groups can be dealt with at the same time. The system is not restricted to temperature measurements. For example, groups for pressure courses in the case of pumps and compressors, flow rates of liquid or gaseous media, etc., can be provided as reference groups. All available measurement data that reflect the effect of wear, contamination, corrosion and operational malfunctions can be incorporated into the system. Thus the user obtains an overall picture of the machine condition and can now assess the condition of the machines or installations: Reported operational malfunctions are tightly limited on the basis of the error that has occurred. Developing failures (crashes) are reported. Optimal times for corrective work, which reflect the condition of the installation, can be established by the service personnel.

The function according to FIG. 3 is now described. Measuring device 25 serves as interface between the process and the PCs. Here the sensor signals are conditioned and converted to physical variables such as pressures, temperatures, flow rates, vibration intensities. Further, computed values can be formed, which in turn serve as (virtual) measurement channels and are equivalent to the true measurement channels. A simple example would be a temperature difference where heat transfer is to take place with the lowest possible losses. These measured data are transduced and passed on to PCs as digital information items via data network.

What is more, the tests and data-processing operations described in what follows could already be executed in measuring device 25, so that the task of the PCs is reduced to a man-machine interface. Such an approach is far less susceptible to malfunctioning, since measuring instrument 25 is conceived, in terms of design, as a field instrument. Failures of the data network and of the PCs would then not be such as to interrupt the continuing checks.

In module 26 the designer of a monitoring apparatus for a special machine has the opportunity to combine given associated measurement channels into reference groups. The expression measurement channels, or briefly channels, denotes measurement chains formed from sensors, lines and measurement electronics. Here such channels are combined into reference groups as have measured values showing mutually dependent tendencies. Such measured values are for example temperatures, pressures, flow rates, rotation speeds, etc. The expression dependent measured variables refers to such as bear an internal relationship to the function or design of a machine or installation.

For example, the individual exhaust temperatures of a large diesel engine with a plurality of cylinders are in an internal relationship. They fluctuate in dependence on external parameters, the fluctuation being roughly proportional. It is governed by the engine rotation speed and engine power.

In module 27, the channels of the reference group are split into identification channels and condition channels. The identification channels serve to identify the quasi-static phase of operation. In the case of the diesel engine, the temperature of the coolant can be employed. Here it is possible to proceed in such fashion that a condition of a steady state is determined. This condition is characterized in that, during a certain time, the water temperature may fluctuate only within a tolerance band. Thus the quasi-static phase of operation can be identified by the fact that the engine is running and the coolant temperature remains constant within 4° C. during 10 minutes. The condition channels of the reference group define the condition of the installation or of a portion of the installation. In the case of monitoring of the engine, the exhaust temperatures, the cylinder pressures and cylinder head temperatures can be employed.

In module 28, a test is performed to ascertain whether the process is in the quasi-static phase of operation or in a transient dynamic condition. The identification conditions are tested continually. Only if the result is true do the measured values become the basis for further investigations.

Module 29 is executed if the result of the test in module 28 is false and thus the dynamic condition prevails. In module 29, dummy values are inserted into the measurement series in place of real measured values. Thus the times of dynamic conditions are bridged over with dummy values. The dummy values take on the value of the real measured value last measured. Because of the dummy values, an examiner of trend charts sees a quasi-continuous data stream, the times, dynamic conditions and stoppages being separately characterized.

In module 30, the measured values including the dummy values are compressed into statistical values (means). Thus the further evaluation has access to second, minute, hour, day and week means, which form statistical time series.

In module 31, the means of the time series are combined into test blocks. Such a test block has a fixed number of means. In the further tests, the test blocks are examined as a whole. The test blocks are set up in moving fashion. This means that the oldest value is dropped from the test block and the newest value is incorporated. The means are converted to percent values so that test blocks of different channels can be compared with one another.

In module 32, a test is performed to ascertain whether, within a test block, there is a percent change in the compressed measured values. The percent change in a test block is referred to as the swing. If the swing exceeds a limiting value, the swing is compared with the mean of the swings of the other test blocks (channels). If the difference exceeds a limiting value, then in the subsequent evaluations the shape of the curve of the test block is tested. If, on the other hand, the difference remains below the limiting value, then no further tests take place.

In module 33, a test is performed to ascertain whether the changes in the values of the test block have taken place in linear or progressive fashion. This is done mathematically with the aid of the second derivative. If the second derivative is tangent to or exceeds a limiting value, the curve of the measured values for the test block is assessed as progressive. If the value of the second derivative remains below the limiting value, the curve is assessed as linear. Progressive changes are rated as very much more severe than linear changes and lead, in what follows, to distinct warning instructions to the service personnel.

Module 34 is invoked if the curve shows a linear trend. Here it is investigated whether the trend is linearly rising or falling. In order to localize an instance of damage it may be advantageous to know whether the out-of-control measured value displays a rising or falling tendency. A rising temperature, for example, points to an instance of developing damage. On the other hand, if the tendency is falling, this might point to a malfunction of a sensor. Such linear malfunctions lead to entries in observation lists 36, because they are rated as less severe.

Module 35 is invoked if the curve shows a progressive trend. Here it is investigated whether the trend is progressively rising or falling. In order to localize an instance of damage, it may be advantageous to know whether the out-of-control measured value displays a rising or falling tendency. A progressively rising temperature, for example, points to an imminent crash. Such progressive modes of behavior lead to entries in warning lists 37.

The entries in observation lists 36 and in warning lists 37 have fixed and individually configurable components. For the prognosis of deviations that have occurred, a number of factors are decisive, such as the course (shape of the curve), the measured variable causing the deviation, and the time series. It makes a very great difference whether a deviation shows up on a scale of seconds or in the week means. Deviations on a scale of seconds indicate suddenly occurring operational malfunctions. Deviations on a scale of hours and days, especially if they are progressive, give reason to fear an imminent crash. Deviations on a scale of weeks point to natural wear.

What is claimed is:

1. A system for monitoring technical processes, machines, installations, apparatuses or the like, in which measured data are acquired via measurement channels, which contain sensors, sensor lines and evaluation electronics, and with governing software, wherein the measurement channels of mutually dependent measured variables are combined into reference groups (module 26) wherein the measurement channels are split into the category of identification channels for defining a quasi-static phase of operation and the category of condition channels (module 27), whose measured date, after computational and comparison procedures, supply information about the condition of the underlying process, wherein a quasi-static phase of operation is defined through identification conditions (module 28), the quasi-static phase of operation being in effect if the identification conditions are fulfilled, wherein gaps arising as a result of downtimes and times of non-quasi-static phase of operation are filled in with dummy values (module 29), wherein the measured values of the condition channels of the reference groups are compressed into time stamped statistical values (module 30), said statistical condition values of the individual time series being aggregated into test blocks being set up in a moving fashion (module 31) so that the oldest value is dropped and the newest value is incorporated, wherein the swing is compared with a limiting value (module 32) and, in the case of exceedance, the swing is compared with the mean of the swings of the other test blocks of the same time series of the reference group and, in the case of exceedance of a further limiting value, the shape of the curve is tested.

2. The monitoring system of claim 1 wherein, if a reference group comprises just one measurement channel, the swing is compared with a limiting value (module 32).

3. The monitoring system of claim 2 wherein a further comparison with the swing of the test block of the next higher or still higher time series is performed (module 32) and, in the case of exceedance of a limiting value, the shape of the curve is tested.

4. The monitoring system of claim 3 wherein the first and second derivatives are employed for defining the shape of the curve (module 33), limiting values of the derivatives determining whether a linear or a progressive behavior is present.

5. The monitoring system of claim 4 wherein the shape of the curve is investigated to determine whether it is sloping linearly upward or downward and progressively upward or downward.

6. The monitoring system of claim 5 wherein the exceedance of limiting values, depending on the severity of the malfunctions established, entries are initiated in observation lists (modules 34, 36), warning lists (modules 35, 37) and alarms.

7. The monitoring system of claim 6 wherein linear changes are rated as less severe than progressive changes.

8. A system for monitoring technical processes, machines, installations, apparatuses or the like, in which measured data are acquired via measurement channels, which contain sensors, sensor lines and evaluation electronics, and with governing software, wherein the measurement channels of mutually dependent measured variables are split into the category of identification channels for defining a quasi-static phase of operation and the category of condition channels (module 27), whose measured data, after computational and comparison procedures, supply information about the condition of the underlying process, wherein, during the running time of a process, tests are continually performed to ascertain whether the identification conditions are fulfilled (module 28), wherein the measured values of the condition channels of the reference groups are compressed into statistical values, (module 30) and the statistical condition values of the individual time series are aggregated into test blocks (module 31) that contain a fixed number of values, said test blocks being set up in moving fashion (module 31) so that the oldest value is dropped and the newest value is incorporated and wherein the swing is compared with a limiting value (module 32) and, in the case of exceedance, the swing is compared with the mean of the swings of the other test blocks of the same time series of the reference group and, in the case of exceedance of a further limiting value, the shape of the curve is tested.

9. The monitoring system of claim 8 wherein, if a reference group comprises just one measurement channel, the swing is compared with a limiting value (module 32).

10. The monitoring system of claim 9 wherein a further comparison with the swing of the test block of the next higher or still higher time series is performed (module 32) and, in the case of exceedance of a limiting value, the shape of the curve is tested if the limiting value is exceeded.

11. The monitoring system of claim 10 wherein the first and second derivatives are employed for defining the shape of the curve (module 33), limiting values of the derivatives determining whether a linear or a progressive behavior is present.

12. The monitoring system of claim 11 wherein the shape of the curve is investigated to determine whether it is sloping linearly upward or downward and progressively upward or downward.

13. The monitoring system of claim 12 wherein the exceedance of predetermined limiting values, entries are initiated in observation lists (modules 34, 36), warning lists (modules 35, 37), or alarms.

14. The monitoring system of claim 13 wherein, in normal operation free of malfunctions, there is a learning phase, permanent data being acquired during this learning phase and the quasi-static phase of operation, by which the limits of normal operation are revealed and the limiting values automatically positioned in each case at the maximal and minimal values.

\* \* \* \* \*